INVENTOR.
Thomas W. Bakewell
BY
F. J. Fodale
ATTORNEY 3,667,767
SEAL WITH VARIABLE SEALING LIP PRESSURE
Thomas W. Bakewell, Huron, Ohio, assignor to General Motors Corporation, Detroit, Mich.
Filed Sept. 14, 1970, Ser. No. 71,808
Int. Cl. F16j 15/32, 15/54
U.S. Cl. 277—95                             1 Claim

ABSTRACT OF THE DISCLOSURE

A seal for a liquid filled chamber has a radially open cavity behind a flexible wall which carries annular sealing lips. Under static conditions the cavity is filled with liquid under positive pressure and increases the sealing lip contact pressure. Under dynamic conditions the liquid is expelled from the cavity, the pressure of the liquid in the seal area is reduced, and the sealing lip contact pressure is lighter.

---

This invention relates generally to seals and, more specifically, to a shaft seal for a chamber filled with liquid under positive pressure.

Such seals are useful for instance, in an automotive fan and water pump assembly where a single power shaft drives an external fan and an internal water pump impeller located in a water filled chamber. In such an application, it is highly desirable to provide a substantially leak-proof seal between the water filled chamber and the shaft bearing because of the corrosive nature of water. Accordingly, it is generally the object of this invention to provide a seal having a substantial sealing lip pressure under static conditions, yet not have excessive torque characteristics under dynamic conditions.

Another object of this invention is to provide a seal which has a variable sealing lip pressure in which the medium being sealed is used advantageously.

Figure 1:
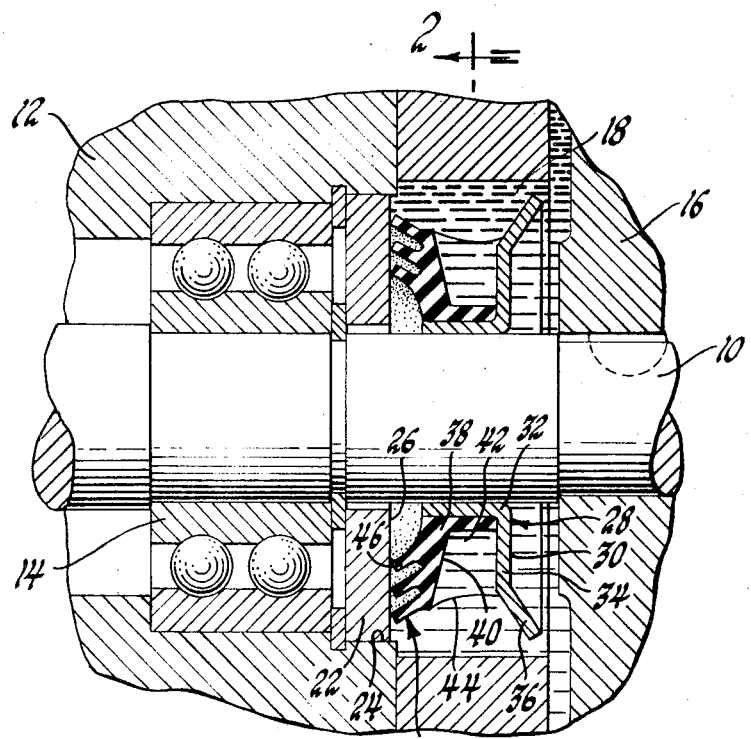
Figure 2:
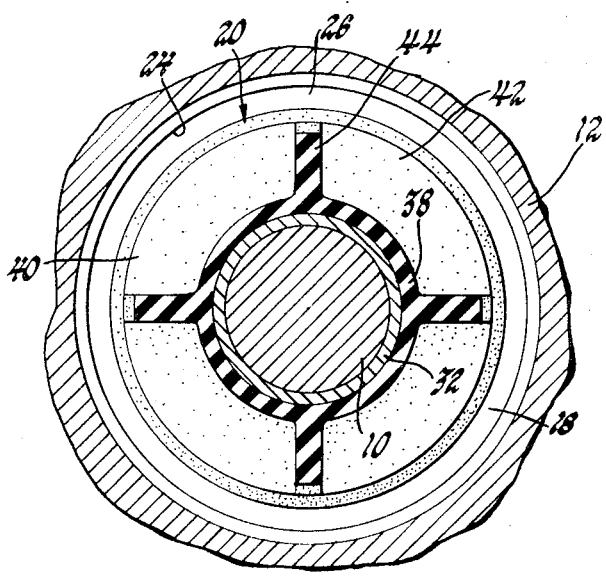

The exact nature of this invention as well as other objects and advantages thereof will be readily apparent from consideration of the following specification relating to the annexed drawing in which:

FIG. 1 is a vertical cross section through a portion of a fan and water pump assembly having a seal in accordance with my invention; and FIG. 2 is a section taken along the line 2—2 of FIG. 1 and looking in the direction of the arrows.

Referring now to the drawing, FIG. 1 shows a portion of an automotive fan and water pump assembly in which a shaft 10 is rotatably mounted to a housing 12 by an antifriction bearing 14. The shaft 10 is driven by a fan belt or other suitable means from the engine, and in turn drives the fan and the water pump impeller 16 which is located in a water filled chamber 18 which forms part of the engine's cooling system.

A sealing means indicated generally at 20 seals the chamber 18 and protects the bearing 14 from the corrosive effects of the water in the chamber 18. The sealing means 20 comprises a stationary ring 22 press fitted into a counterbore 24 in the housing 12 and which has a radial face 26 exposed to the chamber 18. The rotatable sealing element indicated generally at 28 comprises a metal annulus 30 having a flange 32 at its inner margin by means of which the rotatable sealing element 28 is press fitted or otherwise suitably nonrotatably secured on the shaft 10. The radial wall 34 of the metal annulus 32 terminates in a periphery 36 skewed away from the ring 22. The skewing of the periphery 36 adapted the metal annulus 30 to become a slinger when the shaft 10 is rotated.

Bonded to the metal annulus 30 is an elastomeric ring 38 having a flexible radial wall 40 which is spaced from the wall 34 to form a cavity 42. The wall 40 tapers in the radially outward direction for increased flexibility. A plurality of circumferentially spaced ribs 44 extend from the flexible wall 40 and span the cavity 42. Extending from the opposite side of the flexible wall 40 are a number of concentric annular sealing lips 46 which contact the face 26 of the stationary ring 22. Under static conditions, that is, when the shaft 10 is not rotating, the cavity 42 is filled with water; and, when this water is under a positive pressure, the pressure of the sealing lips against the face 26 of the stationary ring 22 is increased due to the flexibility of the wall 40. Under dynamic conditions or when the shaft is rotated, the pressure of the water in the vicinity of the seal is reduced by the ribs 44 and the skewed periphery 36 of the metal annulus 30. This action decreases the seal lip contact pressure, thereby reducing the torque characteristics of the seal under dynamic conditions.

I wish it to be understood that I do not desire to be limited to the exact details of construction shown and described, for obvious modifications will occur to a person skilled in the art.

I claim:
1. The combination comprising
   a housing having a chamber filled with a liquid under positive pressure,
   a wall in said chamber having an aperture and a planar face extending radially outwardly immediately from said aperture,
   a rotatable shaft extending into said chamber through said aperture, and
   seal means for preventing the escape of said liquid from said chamber through said aperture, comprising
      a metal annulus having a circumferential flange nonrotatably and sealingly mounted on said shaft,
      a generally flat radial wall on said metal annulus having a peripheral portion skewed away from said planar face,
      an elastomeric ring bonded to said flange on said metal annulus, said elastomeric ring having a generally radial, flexible wall spaced from said radial wall of said metal annulus defining a radially open cavity therebetween, a plurality of integral circumferentially spaced elastomeric ribs on said radial flexible wall extending axially into engagement with said radial wall of said metal annulus, generally axial, annular lip means extending from the opposite side of said generally radial, flexible wall into resilient sealing contact with said planar face on said wall in said chamber, said lip means contacting said planar face with a pressure adequate to prevent the escape of liquid under said positive pressure when said shaft is stationary and said cavities are filled with liquid under said positive pressure and contacting said planar face with a decreased pressure when said shaft is rotating.

References Cited

UNITED STATES PATENTS

| | | | |
|---|---|---|---|
| 2,478,649 | 8/1949 | Wightman | 277—95 X |
| 3,028,181 | 4/1962 | Thompson et al. | 277—95 X |
| 2,481,430 | 9/1949 | Koller | 277—95 |
| 2,415,888 | 2/1947 | Joy | 277—95 X |

FOREIGN PATENTS

| | | | |
|---|---|---|---|
| 1,111,326 | 4/1968 | Great Britain | 277—133 |

ROBERT G. NILSON, Primary Examiner

U.S. Cl. X.R.

277—133